United States Patent [19]
Madden et al.

[11] Patent Number: 5,814,288
[45] Date of Patent: *Sep. 29, 1998

[54] FLUE GAS DESULFURIZATION METHOD AND APPARATUS

[75] Inventors: Deborah A. Madden, Canfield; George A. Farthing, Washington Township, both of Ohio

[73] Assignee: McDermott Technology, Inc., New Orleans, La.

[ * ] Notice: This patent issued on a continued prosecution application filed under 37 CFR 1.53(d), and is subject to the twenty year patent term provisions of 35 U.S.C. 154(a)(2).

[21] Appl. No.: 669,762

[22] Filed: Jun. 26, 1996

Related U.S. Application Data

[62] Division of Ser. No. 611,605, Mar. 8, 1996.

[51] Int. Cl.$^6$ ........................................................ B01J 8/00
[52] U.S. Cl. .............................. 423/244.01; 423/244.05; 423/244.07; 423/244.08; 110/345
[58] Field of Search ........................... 422/168, 169–173; 95/69, 70, 73; 96/55, 57; 423/244.05, 244.08, 243.08, 244.07, 244.01; 110/345, 216

[56] References Cited

U.S. PATENT DOCUMENTS

| | | |
|---|---|---|
| 3,690,808 | 9/1972 | St. Pierre ..................................... 431/4 |
| 3,715,868 | 2/1973 | Biasi .......................................... 55/315 |
| 3,852,408 | 12/1974 | Ewan et al. ............................ 423/243.1 |
| 3,883,639 | 5/1975 | Cronkright, Jr. et al. ............... 423/242 |
| 3,900,554 | 8/1975 | Lyon ....................................... 423/235 |
| 3,932,587 | 1/1976 | Grantham et al. .................. 423/244.08 |
| 3,933,127 | 1/1976 | Arps ........................................ 122/1 R |
| 3,948,608 | 4/1976 | Weir, Jr. .................................. 422/169 |
| 3,972,980 | 8/1976 | Lowell ................................. 423/243.09 |

(List continued on next page.)

FOREIGN PATENT DOCUMENTS

3407689 A1   9/1985   Germany.

OTHER PUBLICATIONS

Yagiela, A.S. & Hurst, T.B., B&W; and Statnick, R.M., Consolidation Coal Co., "The DOE Sponsored LIMB Project Extension and Coolside Demonstration", The Babcock & Wilcox Company Technical Paper No. BR–1330. Presented to Energy Technology Conference & Exposition, Washington, DC on Feb. 18, 1988. Entire paper.

Liang, A.D., Rodgers, L.W. & LaRue, A.D., B&W, "Potential Applications of Furnace Limestone Injection for $SO_2$ Abatement". The Babcock & Wilcox Company Technical Paper No. RDTPA 84–32. Presented to Coal Technology Conference, Houston, TX on Nov. 13–15, 1984. Entire paper.

*Primary Examiner*—Hien Tran
*Attorney, Agent, or Firm*—R. J. Edwards; Eric Marich

[57] ABSTRACT

A combined furnace limestone injection and dry scrubber flue gas desulfurization (FGD) system collects solids from the flue gas stream in first particulate collection device located downstream of an outlet of a convection pass of the furnace and upstream of the dry scrubber. The collected solids are diverted to the dry scrubber feed slurry preparation system to increase sulfur oxide species removal efficiency and sorbent utilization. The level of lime in the feed slurry provided to the dry scrubber is thus increased, which enhances removal of sulfur oxide species in the dry scrubber. The decreased particulate loading to the dry scrubber helps maintain a desired degree of free moisture in the flue gas stream entering the dry scrubber, which enhances sulfur oxide species removal both in the dry scrubber and downstream particulate collector, normally a baghouse.

8 Claims, 4 Drawing Sheets

U.S. PATENT DOCUMENTS

| | | | |
|---|---|---|---|
| 3,976,747 | 8/1976 | Shale et al. | 423/243.08 |
| 3,989,010 | 11/1976 | Arps | 122/1 R |
| 4,018,868 | 4/1977 | Knight | 423/244.08 |
| 4,062,926 | 12/1977 | Knight | 423/244.05 |
| 4,070,441 | 1/1978 | Pessel | 423/243.12 |
| 4,084,545 | 4/1978 | Nack et al. | 122/4 D |
| 4,093,026 | 6/1978 | Ridley | 166/256 |
| 4,113,840 | 9/1978 | Hanway, Jr. et al. | 423/242.03 |
| 4,125,157 | 11/1978 | Ridley | 166/259 |
| 4,140,181 | 2/1979 | Ridley et al. | 166/259 |
| 4,178,349 | 12/1979 | Wienert | 423/244.05 |
| 4,197,278 | 4/1980 | Gehri et al. | 423/243.08 |
| 4,208,386 | 6/1980 | Arand et al. | 423/235 |
| 4,220,633 | 9/1980 | Pirsh | 423/239.1 |
| 4,279,873 | 7/1981 | Felsvang et al. | 423/243.08 |
| 4,288,420 | 9/1981 | Ito et al. | 423/239.1 |
| 4,309,386 | 1/1982 | Pirsh | 422/177 |
| 4,310,498 | 1/1982 | Malki et al. | 423/243.01 |
| 4,372,770 | 2/1983 | Krumwiede | 65/345 |
| 4,452,765 | 6/1984 | Peterson et al. | 423/423.08 |
| 4,481,170 | 11/1984 | Wier, Jr. | 422/168 |
| 4,508,573 | 4/1985 | Harris | 106/757 |
| 4,525,142 | 6/1985 | Gleason et al. | 423/235 |
| 4,555,392 | 11/1985 | Steinberg | 423/244.05 |
| 4,555,996 | 12/1985 | Torbov et al. | 110/345 |
| 4,559,211 | 12/1985 | Feldman et al. | 423/243.01 |
| 4,588,569 | 5/1986 | Cyran et al. | 423/244.08 |
| 4,600,438 | 7/1986 | Harris | 106/757 |
| 4,616,576 | 10/1986 | Enström et al. | 431/7 |
| 4,623,523 | 11/1986 | Abrams et al. | 423/243.08 |
| 4,765,258 | 8/1988 | Zauderer | 110/347 |
| 4,780,291 | 10/1988 | Sayler et al. | 423/244.05 |
| 4,793,981 | 12/1988 | Doyle et al. | 423/239.1 |
| 4,800,825 | 1/1989 | Kuezly | 110/345 |
| 4,804,521 | 2/1989 | Rochelle et al. | 423/244.04 |
| 4,824,360 | 4/1989 | Janka et al. | 431/7 |
| 4,824,441 | 4/1989 | Kindig | 44/604 |
| 4,854,249 | 8/1989 | Khinkis et al. | 110/342 |
| 4,867,955 | 9/1989 | Johnson | 423/244.07 |
| 4,871,522 | 10/1989 | Doyle | 423/239.1 |
| 4,885,139 | 12/1989 | Sparks et al. | 422/169 |
| 4,888,158 | 12/1989 | Downs | 423/243.04 |
| 4,889,698 | 12/1989 | Moller et al. | 423/210 |
| 4,915,920 | 4/1990 | Kobayashi | 423/239.1 |
| 4,922,840 | 5/1990 | Woodroffe et al. | 110/345 |
| 4,931,264 | 6/1990 | Rochelle et al. | 423/244.01 |
| 4,956,162 | 9/1990 | Smith et al. | 423/244.07 |
| 4,975,257 | 12/1990 | Lin | 423/244.07 |
| 5,002,743 | 3/1991 | Kokkonen et al. | 423/244.05 |
| 5,006,323 | 4/1991 | Johnson | 423/239.1 |
| 5,029,535 | 7/1991 | Krigmont et al. | 110/345 |
| 5,048,431 | 9/1991 | Landerth et al. | 110/343 |
| 5,058,514 | 10/1991 | Mozes et al. | 110/345 |
| 5,078,973 | 1/1992 | Kuroda et al. | 422/171 |
| 5,105,747 | 4/1992 | Khinkis et al. | 110/345 |
| 5,165,902 | 11/1992 | Bortz et al. | 423/235 |
| 5,165,903 | 11/1992 | Hunt et al. | 423/239.1 |
| 5,176,088 | 1/1993 | Amrhein et al. | 110/345 |
| 5,194,076 | 3/1993 | Myers et al. | 55/220 |
| 5,209,915 | 5/1993 | Kidwell | 423/243.01 |
| 5,215,557 | 6/1993 | Johnson et al. | 55/230 |
| 5,220,875 | 6/1993 | Cox | 110/345 |
| 5,246,364 | 9/1993 | Landreth et al. | 431/3 |
| 5,273,721 | 12/1993 | Hallstrom | 422/147 |
| 5,344,614 | 9/1994 | Tang | 422/170 |
| 5,344,632 | 9/1994 | Tang | 423/244.07 |
| 5,364,572 | 11/1994 | Wu et al. | 264/40.1 |

OTHER PUBLICATIONS

Sawyers, L.E. Smith, P.V. & Hurst, T.B., B&W, "Flue Gas Desulfurization by Combined Furnace Limstone Injection and Dry Scrubbing". The Babcock & Wilcox Company Technical Paper No. RDTPA 84–32. Presented at the 1st Joint Symposium on Dry $SO_2$ and Simulataneous $SO_2/NO_x$ Control Technologies, San Diego, CA on Nov. 13–16, 1984. Entire paper.

Madden, D.A. & Farthing, G.A., B&W, Development of the Advanced LIDS™Systems as an Intergral Part of the Babcock & Wilcox Low Emission Boiler System. The Babcock Company Technical Paper No. RDTA 94–15. Presented at the AFRC/JFRC Pacific Rim International Conference on Enviromental Control of Combustion Processes, Maui, HI on Oct. 16–20, 1994. Entire paper.

Feeney, S., Martinelli, R., Myersd, R., and Bailey, R., B&W, "Evolution of the B7W DuraJet™Atomizer". The Babcock & Wilcox Company Technical Paper No.BR–1458. Presented to 1991 $SO_2$ Control Symposium, Grand Hyatt Washington on Dec. 3–6, 1991. Entire paper.

The Babcock & Wilcox Company Product Brochure No. PS–293, "Custom–Engineered DuraJet™Atomizer for Slurry and Fuel Applications". ©Copyright The Babcock & Wilcox Company, 1990. Entire paper.

Wheelabrater–Frye Inc. & Rockwell International Product Brochure, "Dry $SO_2$ and Particulate Removal System". Date unknown. Entire paper.

Ellison, W., Ellison Consultants; Leimkuhler, J., GEA Kuhlturmbau und Luftkondensation GmbH; and Makansi, J., "West Germany meets strict emission codes by advancing FGD". Article in *Power*, Feb., 1986, pp. 29–33.

The Babcock & Wilcox Company Product Brochure No. PS–319, "In–Duct $SO_2$ *Scrubbing Uses Existing Ductwork*". ©Copyright The Babcock & Wilcox Company, 1991. Entire paper.

*FGD handbook,* Klingspor & Cope, Editors, ©Copyright IEA Coal Research 1987, pp. 124–125, 128–129, 138–139, and 184–185.

Ontario Hydron Publication, *Tech Talk,* vol. 4, No. 4, Dec. 1990, "Aggresive FGD Program Will Reduce Acid Gas Emission", pp. 1–3.

The Babcock & Wilcox Company Product Brochure, "LIDS™—Limestone Injection with Dry Scrubbing". ©Copyright The Babcock & Wilcox Company, 1988. Entire paper.

Nolan, P.S., B&W and Hendriks, R.V., U.S. Enviromental Protection Agency —Air and Energy Engineering, "Intial test results of the limestone injection multistage burner (LIMB) demonstration project". The Babcock & Wilcox Company Technical Paper No. BR–1343. Presented at the 81st Annual Meeting of the Air Pollution Control Association, Dallas, TX on Jun. 20–24, 1988. Entire paper.

Rackley, J.M. & Womack Jr., E.A., "Coal —Retrofitting and Repowering for Future Use". The Babcock & Wilcox Company Technical Paper RDTPA 91–36. Presented at the First World Coal Institute Conference, The Queen Elizabeth II Conference Centre, London, England on Apr. 3–5, 1991. Entire paper.

Amrhein, G.T., Smith, P.V., Vecci, S.J., and Batyko, R.J. B&W, "Pilot Scale Demonstration of the LIDS™System for Low–Cost Boiler Pollution Control ". The Babcock & Wilcox Company Technical Paper No. RDTPA 91–12. Presented to the 2nd International Symposium on Coal, Beijing, China on Oct. 7–10, 1991. Entire paper.

Doyle, J.B. and Jankura, B.J., B&W, "Furnace Limestone With Dry Scrubbing of Exhaust Gases". The Babcock & Wilcox Company Technical Paper No. RDTPA 82–13. Presented to the 1982 Spring Technical Meeting of the Central States Section of the Combustion Institute, Columbus, OH on Mar. 22–23, 1982. Entire paper.

Batkyo, R.J., Nolan, P.S. & Telesz R.W., B&W, "Available Technologies for $SO_2$ Control —Furnace to Stack". The Babcock & Wilcox Company Technical Paper No. BR–1462. Presented at ASME International Joint Power Generation Conference, San Diego, CA on Oct. 6–10, 1991. Entire paper.

Amrhein, G.T, Smith, P.V., Vecci, S.J. & Batyko, R.J., B&W, "Pilot–Scale Demonstration of the LIDS ™System for $SO_2$ Control of High –Sulfur Coal". The Babcock & Wilcox Company Technical Paper No. RDTPA 92–17. Presented at the 17th International Conference on Coal Utilization and Slurry Technologies Clearwater, FL on Apr. 28–May 1, 1992. Entire paper.

FIG. 3

FLUE GAS DESULFURIZATION METHOD AND APPARATUS

This is a division of application Ser. No. 08/611,605 filed Mar. 8, 1996.

This invention was made with U.S. Government support under Contract No. DE-AC 22-92PC92160-W(A)-92039, CH-0751, awarded by the Department of Energy. The U.S. Government has certain rights in this invention.

FIELD AND BACKGROUND OF THE INVENTION

The present invention relates in general to flue gas desulfurization (FGD) systems and, in particular, to a combined furnace limestone injection and dry scrubber (also commonly referred to as a spray dryer) system. The invention collects solids from a flue gas stream at a point downstream of the combustion furnace and upstream of the dry scrubber. The collected solids are diverted to a dry scrubber feed slurry reagent preparation system to increase sulfur dioxide ($SO_2$) removal efficiency and sorbent utilization.

Figure 1:
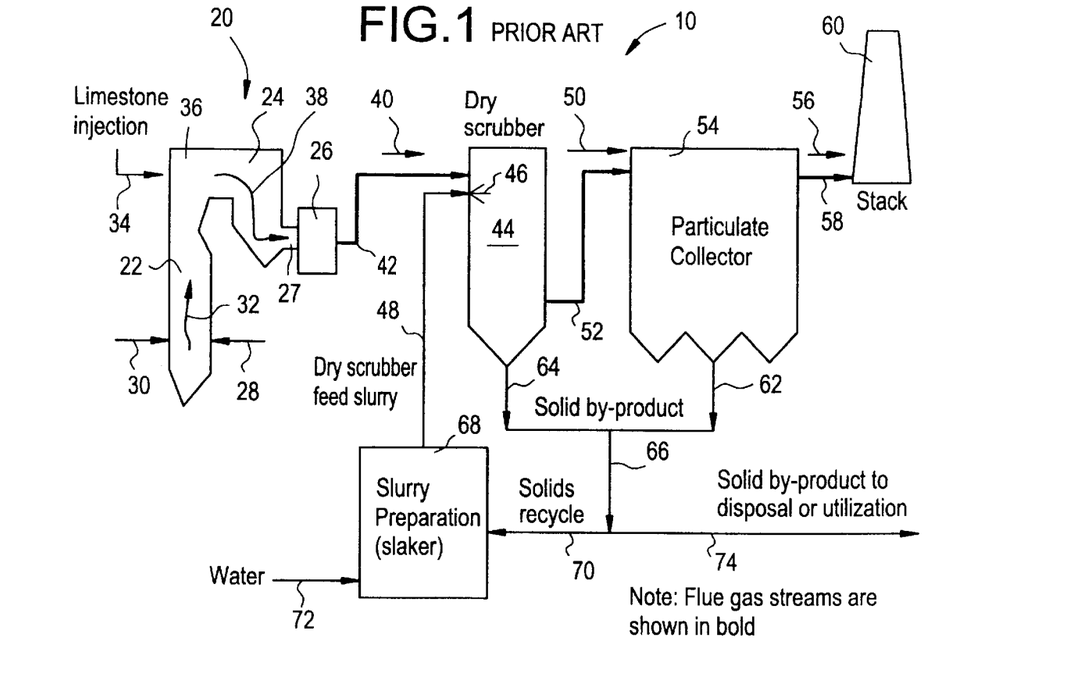
FIG. 1 is a schematic representation of the major components and process flow streams of the prior art limestone injection dry scrubbing (LIDS™) system and process.

The Babcock & Wilcox Company (B&W) Limestone Injection Dry Scrubbing (LIDS™) system and process was developed for controlling particulate and sulfur dioxide ($SO_2$) emissions from flue gases produced by fossil-fueled steam generators during the combustion process. The LID™ system is a cost-effective, integrated approach which uses three commercially-proven flue gas cleanup technologies: furnace limestone injection, dry scrubbing, and pulse-jet fabric filtration, and is applicable to boilers fired with coal and/or a variety of other fossil fuels. A schematic representation of the major components and process flow streams of the LIDS™ system and process is shown in FIG. 1, and Table 1 below contains a listing of the chemical reactions important in the LIDS™ system and process.

TABLE 1

Important Chemical Reactions for the LIDS ™ System and Process

Furnace/Boiler

$CaCO_3$ + heat $\Rightarrow$ $CaO$ + $CO_2$
$CaO$ + $SO_2$ + ½$O_2$ $\Rightarrow$ $CaSO_4$

Slaking

$CaO$ + $H_2O$ $\Rightarrow$ $Ca(OH)_2$ + heat

Dry Scrubber and Baghouse

$Ca(OH)_2$ $\Rightarrow$ $Ca^{+2}$ + $2OH^-$
$SO_2$ + $H_2O$ $\Rightarrow$ $HSO_3^-$ + $H^+$
$SO_2$ + $OH^-$ $\Rightarrow$ $HSO_3^-$
$HSO_3^-$ + $OH^-$ $\Rightarrow$ $SO_3^{-2}$ + $H_2O$ $Ca^{+2}$ + $SO_3^{-2}$ + 1/2$H_2O$ $\Rightarrow$ $CaSO_3$ .1/2$H_2O$ $Ca(OH)_2$ + $SO_2$ $\Rightarrow$ $CaSO_3$ .1/2$H_2O$ + 1/2$H_2O$ Modifications to the LIDS™ system and process have been developed to achieve both $NO_x$ and $SO_x$ removal. U.S. Pat. No. 5,176,088 to Amrhein et al., assigned to The Babcock & Wilcox Company, describes such a process and apparatus and also contains, at col. 3, lines 25–40, a general description of the concepts behind the LIDS™ system and process. As described therein, LIDS™ is an $SO_2$ control technology that involves furnace limestone ($CaCO_3$) injection followed by dry scrubbing and particulate collection. The optimum temperature for limestone injection is about 2200° F., and thus is generally performed in the upper region of the furnace. Injection at higher temperatures causes "dead burning", which decreases sorbent reactivity. Injection at lower temperatures inhibits calcination which also reduces sorbent reactivity. One of the main features of LIDS™ is that a portion of the unreacted sorbent leaving the furnace can be slurried (mixed with water to form a pumpable suspension) and recycled to the dry scrubber by a stream to remove more $SO_2$. Additional $SO_2$ removal occurs in the downstream particulate control device especially if a baghouse is used. As shown in the Fig. of U.S. Pat. No. 5,176,088, it is the ash from the particulate collector downstream of the dry scrubber, that is recycled to produce the slurry.

Referring back to FIG. 1 of the present application, there is shown a schematic representation of the known LIDS™ system and process, generally designated 10, as applied to reduce $SO_2$ emissions from a fossil-fueled industrial or utility steam generator 20. Steam generator 20 is comprised of a furnace 22, convection pass 24 (within which are located banks of heat transfer tube surface, not shown), and, in many installations, an air heater 26 located at an outlet 27 of the convection pass 24 of steam generator 20. Air heater 26 transfers a portion of the heat from the flue gases generated during the combustion process occurring in furnace 22 to incoming combustion air 28. Combustion air 28 is combined with fossil fuel 30, typically coal containing some sulfur, in the furnace 22 producing flue gases 32 containing $SO_2$.

Limestone ($CaCO_3$) 34 is finely pulverized and injected as a dry powder into the flue gases 32 in an upper portion 36 of the furnace 22 of steam generator 20. Upon injection, the limestone 34 undergoes calcination to form lime (CaO), a portion of which reacts with the $SO_2$ in the flue gases 32, forming calcium sulfate ($CaSO_4$). This mixture 38 of flue gases 32 and particulates (primarily fly ash, $CaSO_4$ and unreacted lime (CaO)) exits the steam generator 20, and passes through air heater 26. Cooled flue gas 40 is thus provided to a dry scrubber 44 via flue 42. Within dry scrubber 44, the flue gases 40 and particulates are contacted by a slurry 46 containing calcium hydroxide ($Ca(OH)_2$), which is provided to dry scrubber 44 via slurry supply line 48. Advantageously, the feed slurry 46 may be provided by any type of well-known atomomizer means, such as by use of a dual fluid atomizer as is disclosed in U.S. Pat. No. 4,819,878. In the dry scrubber 44, $SO_2$ in the flue gases 40 reacts with the calcium hydroxide in the slurry droplets to form solid by-products of calcium sulfite ($CaSO_3$) and calcium sulfate ($CaSO_4$). Hence, further $SO_2$ removal occurs in the LIDS™ dry scrubber 44. Nearly complete evaporation of the water in the feed slurry 46 occurs in the dry scrubber 44. Thus, the flue gases 40 are cooled and humidified, while the particulate phase is dried.

Flue gases 50 leave the dry scrubber 44 via flue 52 and enter a particulate collector 54 where coal fly ash, spent sorbent, and unreacted sorbent particles are collected. While the particulate collector 54 can be either a fabric filter (baghouse) or an electrostatic precipitator, the use of a baghouse is preferred because of the additional $SO_2$ removal it yields as the flue gases 50 pass through the sorbent-containing filter cake on the filter bags. Treated flue gas 56 leaves particulate collector 54 via flue 58 and is discharged to the atmosphere via stack 60. Collected particles from the particulate collector 54 and the dry scrubber 44 are conveyed via lines 62, 64, respectively, to line 66. The majority of the solids are taken from line 66 to a dry scrubber reagent preparation (slaker) system 68 via solids recycle line 70. Water 72 is provided to slaker 68 to produce the feed slurry 46 for the dry scrubber 44. The remainder of the solids collected are conveyed to disposal and/or further utilization via discharge line 74.

The LIDS™ system and process comprise the integration of several flue gas treatment processes, each of which has been demonstrated commercially. Furnace limestone injection has been demonstrated at commercial scale during the LIMB demonstration at Ohio Edison's Edgewater Station and elsewhere, and is now offered commercially. Dry scrubbers, electrostatic precipitators, and baghouses have been commercially available for many years.

The LIDS™ process has been demonstrated at the B&W Alliance Research Center in a 1.8 MWt (thermal input) pilot facility. Results indicated that greater than 90% $SO_2$ removal was possible when using a baghouse for final particulate collection, and while burning a high sulfur coal. However, sorbent utilization efficiency was less than 50 percent during these tests. This means that more than one-half of the incoming calcium in the sorbent was not utilized, i.e., did not react with $SO_2$. Theoretically, only one mole of calcium is needed to remove one mole of sulfur dioxide. The calcium-to-sulfur stoichiometry (Ca/S) is said to be equal to 1.0 under such conditions. Most of the cited LIDS™ test results were achieved while injecting an amount of limestone into the furnace 22 equivalent to a Ca/S=2.0.

LIMITATIONS OF THE PRIOR ART

It is commercially attractive to increase both the $SO_2$ removal and sorbent utilization efficiencies of the LIDS™ process. However, as the sorbent utilization efficiency is increased, the concentration of reactive calcium in the ash recycle stream provided via line 70 decreases. For example at 98% $SO_2$ removal and a Ca/S at the furnace of 1.4 mole Ca/mole $SO_2$, the concentration of reactive calcium species in the ash recycle stream (70) would be approximately 10%. It becomes less and less useful to recycle ash from the final particulate collector 54 as the sorbent utilization increases.

It has been established by data collected during LIDS™ testing in March, 1994, at the B&W Alliance Research Center that it is important to maintain a greater than 0.5% free moisture content in the solids in the particulate control device 54 for successful $SO_2$ removal from the flue gases to occur in the particulate control device 54. This is especially true in the case where the final particulate collector 54 is a baghouse. The data indicate a direct relationship between the amount of free moisture in the solids and $SO_2$ capture efficiency in both the dry scrubber 44 and baghouse particulate collector 54.

The results also indicate that the dry solids—fly ash, calcium sulfate, and calcium oxide—in the flue gas stream 40 entering the dry scrubber 44 may absorb, adsorb, or react with much of the free moisture in the system. This can result in a less than 0.5% free moisture content in the solids in the particulate control device 54 which, in turn, results in poor $SO_2$ capture in the baghouse particulate collector 54.

Other inventions have used processes which contain unit operations similar to those used in the present invention. However, they fail to recognize or quantify the unique advantages of the particular embodiments of the present invention. U.S. Pat. Nos. 4,867,955 and 5,006,323 to Johnson, for example, describe preferred embodiments of an invention for flue gas desulfurization which in some cases contain a particulate collector, and at other times a dry scrubber. However these inventions do not propose the combination of a dry scrubber with an upstream particulate collector, nor do they address or recognize the unique advantages of such an embodiment. U.S. Pat. No. 4,915,920 to Kobayashi describes the use of a particulate collector for use in a dry injection desulfurization process, but makes no reference to the use of a dry scrubber. U.S. Pat. No. 4,178,349 to Wienert also describes an invention which uses a particulate collector in conjunction with a dry injection desulfurization process. Again, the unique advantages of the use of the particulate collector upstream of a dry scrubber are not recognized or addressed.

It is thus apparent that an improved limestone injection dry scrubbing system for desulfurizing flue gases which would address these potential problems and achieve enhanced $SO_2$ removal and improved sorbent utilization ratios would be welcomed by the industry.

SUMMARY OF THE INVENTION

One aspect of the present invention is drawn to a method for desulfurizing and removing particulates from flue gas produced during a combustion process in a furnace of a steam generator to produce treated flue gas. The method comprises injecting limestone into an upper portion of the furnace in the temperature range of approximately 2000°–2400° F. to calcine a portion of the limestone into lime, some of the lime reacting with sulfur oxide species from the flue gas therein and producing calcium sulfate. A portion of the lime in the flue gas is collected in first particulate collection means located downstream of the furnace and upstream of dry scrubber means. The method further comprises the step of slurrying the collected lime with water to produce a dry scrubber feed slurry containing hydrated lime. The flue gas, from which the portion of the lime has been removed, is conveyed to dry scrubber means. The dry scrubber feed slurry is sprayed into the flue gas within the dry scrubber means to further absorb sulfur oxide species from the flue gas therein by reaction with a portion of the lime and hydrated lime. The flue gas, lime, and hydrated lime are conveyed to second particulate collection means, where additional absorption of sulfur oxide species from the flue gas by reaction with the lime and hydrated lime occurs. Finally, the method includes the step of collecting particulates from the flue gas in the second particulate collection means to produce treated flue gas.

Another aspect of the present invention is drawn to a system for desulfurizing and removing particulates from flue gas produced during a combustion process in a furnace of a steam generator to produce treated flue gas. The system comprises means for injecting limestone into an upper portion of the furnace in the temperature range of approximately 2000°–2400° F. to calcine a portion of the limestone into lime, some of the lime absorbing sulfur oxide species from the flue gas therein and producing calcium sulfate. First particulate collection means are provided for collecting a portion of the lime from the flue gas at a location downstream of the furnace and upstream of dry scrubber means. Means are provided for slurrying the collected lime with water to produce a dry scrubber feed slurry containing hydrated lime. Means are also provided for conveying the flue gas, from which the portion of the lime has been removed, to dry scrubber means. Further means are provided for spraying the dry scrubber feed slurry into the flue gas within the dry scrubber means to further absorb sulfur oxide species from the flue gas therein by reaction with a portion of the lime and hydrated lime, producing reaction products. Means are provided for conveying the flue gas, lime, hydrated lime, and reaction products to second particulate collection means, where additional absorption of sulfur oxide species from the flue gas by reaction with the lime and hydrated lime occurs. Finally, means are provided for collecting particulates from the flue gas in the second particulate collection means to produce treated flue gas.

Still other aspects of the present invention involve methods and systems for removing pollutants from flue gas produced during a combustion process in a furnace of a steam generator to produce treated flue gas, using a calcium-based sorbent.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

DESCRIPTION OF THE PREFERRED EMBODIMENTS

Figure 2:
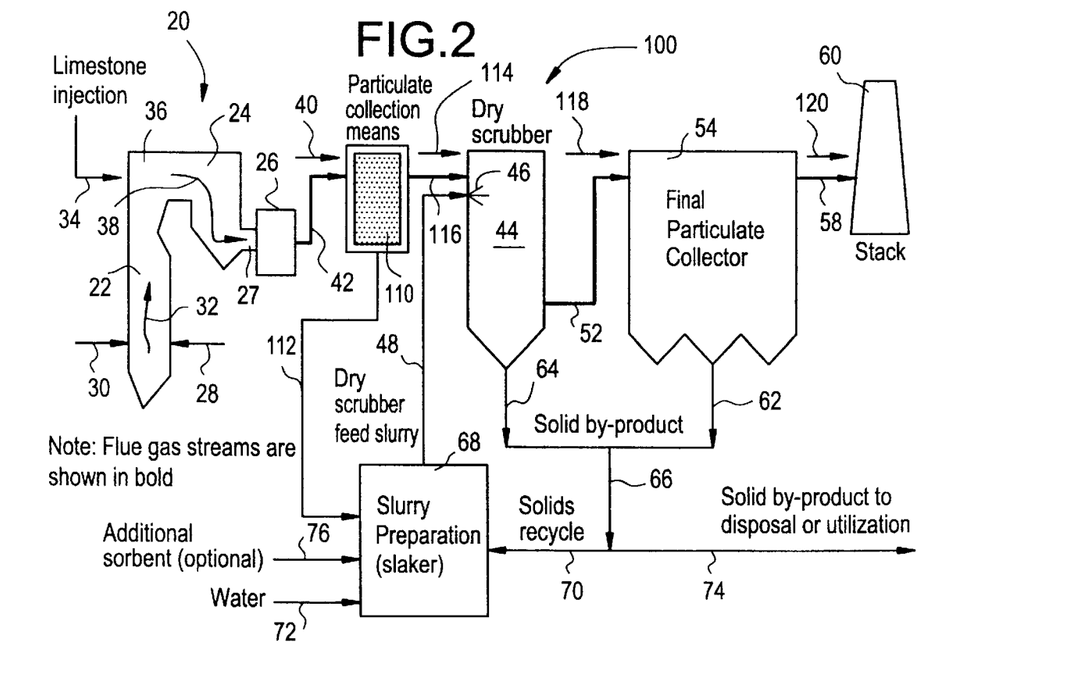
FIG. 2 is a schematic representation of the major components and process flow streams of a first embodiment of the enhanced limestone injection dry scrubbing (E-LIDS™) system and process according to the present invention.
Figure 3:
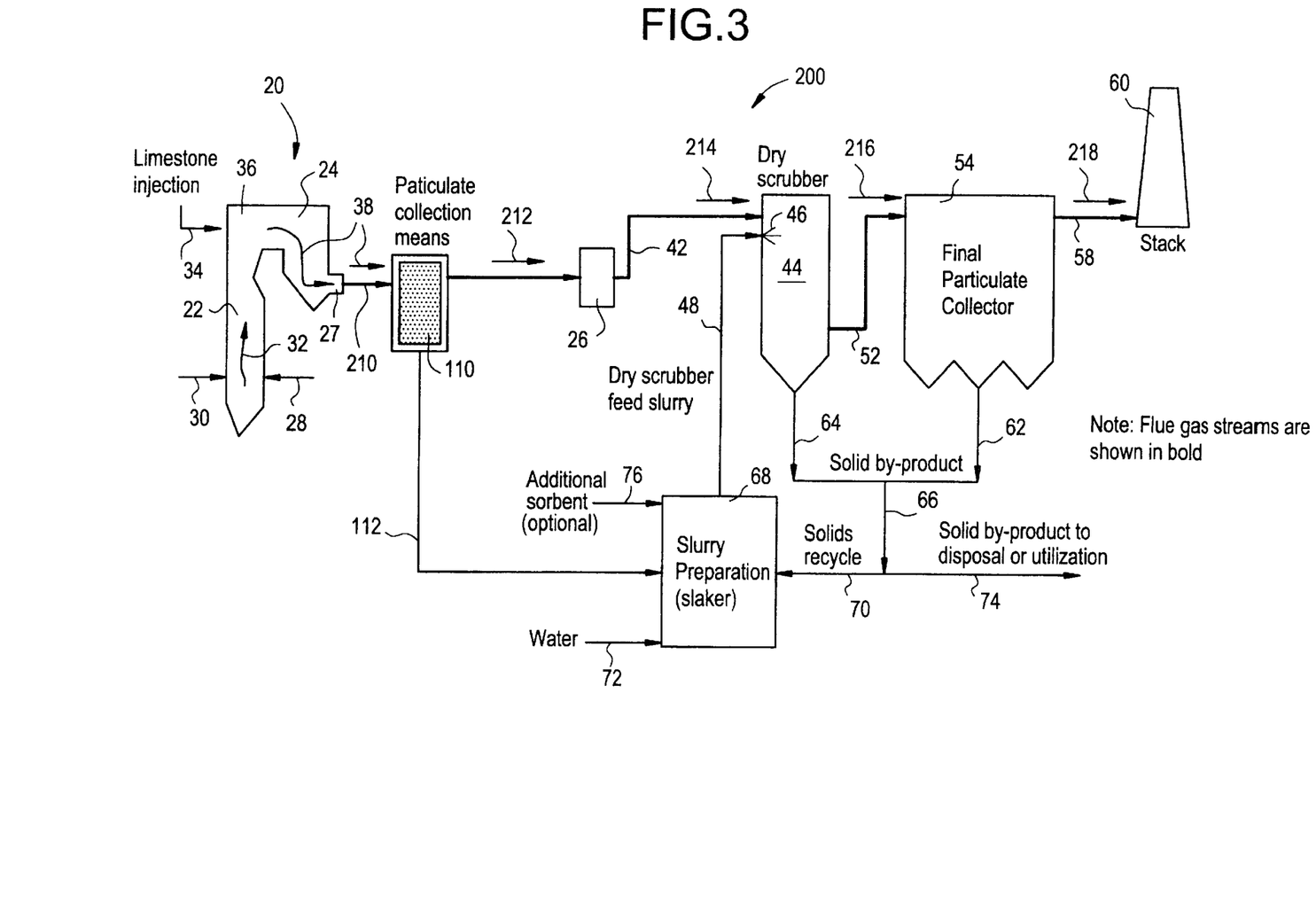
FIG. 3 is a schematic representation of the major components and process flow streams of a second embodiment of the enhanced limestone injection dry scrubbing (E-LIDS™) system and process according to the present invention.

The present invention is an improvement upon the LIDS™ system and process described above and operates on similar principles. However, a new feature of the E-LIDS™ system and process of the present invention is the incorporation of additional particulate collection means 110 positioned in the flue gas stream downstream of the steam generator 20 furnace 22 and upstream of the dry scrubber 44 to remove particulate matter (primarily fly ash, calcium sulfate ($CaSO_4$), and lime (CaO)) entrained in the flue gases 38, 40 leaving the steam generator 20. The specific type of particulate collection means 110 selected depends upon the amount of particulates desired to be collected from the flue gases 40 for a particular application. Examples of suitable devices which could be employed as the particulate collection means 110 include: inertial separation devices such as a simple bend in a flue or a cyclone separator; inertial impact-type particle collectors; U-beam impact type particle separators; fabric filters; baghouses; and electrostatic precipitators. The particulates collected by the particulate collection means 110 are diverted directly to the dry scrubber feed slurry reagent preparation system 68 where they provide the sorbent material sprayed into the dry scrubber 44. The particulate collection means 110 is provided to collect the sorbent material particles from the flue gas; however, it is recognized that other particles of fly ash and reaction products (e.g. calcium sulfate) will also be collected according to the performance characteristics of the particulate collection means 110.

The present invention recognizes that the particulates in the flue gas stream exiting from the steam generator is a good source of concentrated sorbent and seeks not to discard these particles but to use them as a primary source of the sorbent used in the preparation of the dry scrubber feed slurry. For example at 98% $SO_2$ removal and a Ca/S (molar basis) at the furnace of 1.4 mole Ca/mole $SO_2$, the concentration of reactive calcium species in the particles collected by the particulate collection means 110 and transported via line 112 would be approximately 35%. This is 25% higher in reactive calcium species content than the prior art LIDS™ case cited earlier in which the recycle stream 70 was only 10% reactive calcium. The present invention uses the particulate collection means in a novel and unobvious manner which solves the aforementioned problems that can occur in the original, prior art LIDS™ system and process.

Various types of calcium-based sorbents can be injected into the upper portion 36 of furnace 22. Limestone is preferred, due to its low cost, ready availability, and ease of processing. Other calcium-based sorbents such as hydrated lime, dolomitic lime, calcitic lime, lime, and the like will also suffice. The choice will largely be a matter of economics. The limestone is pulverized for injection; the grinding size criteria is again a matter of economics. The finer the better, but excessive grinding is costly. The sorbent need only be pulverized fine enough so that a large majority of it will be carried along with the flue gas instead of tending to immediately fall out after injection. Further, as used herein, the term sulfur oxide species is used to refer to sulfur dioxide ($SO_2$) and sulfur trioxide ($SO_3$), while the term pollutant refers to such sulfur oxides, particulates, or hazardous air pollutants as identified in the Clean Air Act Amendment of 1990.

Referring to the drawings generally, wherein like numerals designate the same or functionally similar elements throughout the several drawings, and to FIG. 2 in particular, there is shown a schematic representation of the major components and process flow streams of a first embodiment, generally designated 100, of the enhanced limestone injection dry scrubbing (hereinafter referred to as ENHANCED LIDS™ or E-LIDS™) system and process of the invention.

As shown, particulate collection means 110 is provided to collect particles from the flue gas stream. Particulate collection means 110 is provided downstream of the furnace 22 of steam generator 20 but upstream of the dry scrubber 44. Flue 42 from air heater 26 provides the flue gases 40 to the particulate collection means 110, while flue 116 directs the exiting flue gases 114 from the particulate collection means 110 to the dry scrubber 44. Particles collected by the particulate collection means 110 are transported via line 112 to the slurry preparation system 68.

In the LIDS™ system and process of FIG. 1, most of the $SO_2$ removal is accomplished in the dry scrubber 44 by the reaction of $SO_2$ with calcium hydroxide ($Ca(OH)_2$) that enters with the feed slurry 46, not with the calcium oxide (CaO) that enters with the flue gases 40. Therefore, the $SO_2$ removal efficiency of the dry scrubber 44 depends on the amount of calcium hydroxide entering the dry scrubber 44 in the feed slurry 46. Since the total amount of slurry that can be injected into the dry scrubber 44 is limited by the heat available to evaporate the water, it is desirable to have the concentration of calcium hydroxide in the feed slurry 46 as high as possible. In the LIDS™ system and process, the recycle solids stream provided via line 70 used to prepare the feed slurry 46 for the dry scrubber 44 has a low ratio of useful calcium to unreactive material. This is especially true as the calcium utilization of the process increases. This problem/effect is overcome by the present invention by providing a stream of solids from the flue gas 40 exiting the steam generator 20 which is much more concentrated in reactive calcium oxide that is diverted directly to the slurry preparation system 68. The reactive calcium hydroxide concentration in the feed slurry stream 46 provided to the dry scrubber 44 is thus increased, resulting in improved $SO_2$ removal therein. For example, under the same conditions of 98% $SO_2$ removal and a Ca/S of 1.4, the reactive calcium hydroxide concentration of the solids in the dry scrubber feed slurry 48 would be 10% of the LIDS™ case and 30% of the E-LIDS™ case.

It is also important for the solids in the final particulate collector 54 to contain greater than 0.5% free moisture if high $SO_2$ removal efficiencies are to be achieved. In the LIDS™ system and process, when the dry calcium oxide, calcium sulfate, and fly ash in the flue gases 40 leaving the steam generator 20 enter the moist, humid environment of the dry scrubber 44, there is evidence that they may adsorb, absorb, or react with the available water. As the quantity of dry solids entering the dry scrubber 44 increases as the result of increased fly ash carryover from the steam generator 20 or due to an increased limestone injection rate, the amount of water consumed through this process also increases. Water may be consumed to such an extent that there is virtually no free moisture in the solids leaving the dry scrubber 44. As the free moisture entering the final particulate collection means 54 decreases, the $SO_2$ removal in the final particulate collection means 54 decreases.

In contrast, according to the system and process of the present invention, a portion of the solids in the flue gas stream 40 exiting the steam generator 20 are sent directly to the slaking system 68. This reduces the amount of dry particulate matter entering the dry scrubber 44, significantly decreasing the likelihood that the phenomena described above will result in an unacceptably low free moisture content for the solids exiting the dry scrubber 44. Data collected during E-LIDS™ system testing in January, 1995 at the B&W Alliance Research Center showed an increase in the final particulate device 54 solids free moisture content when in E-LIDS™ system mode versus LIDS™ system mode. On average, the free moisture content was 0.75% for LIDS™ system mode with an improvement to 1.35% with E-LIDS™ system mode.

As indicated earlier, the particulate collection means 110 can comprise any known form of device which can separate and remove particulates entrained within a gas stream. The entering flue gas temperature and pressure, together with the particulate loading, and desired draft loss through the device would be specified in advance for each particular application. Likewise the particulate collection device efficiency would also be specified, based upon the amount of particles that is desired to be collected from the flue gas stream 40 at this point. One or more particulate collection devices may be provided, to provide both for redundancy of operation and/or to adjust to space limitations or operating criteria. For example, if plural particulate collection devices 110 are provided, some may be taken out of service as load on the steam generator 20 is decreased. The converse may be true when load on the steam generator increases. Partially clean flue gas 114 exits from the particulate collection means 110 and is provided to the dry scrubber 44 for removal of $SO_2$ therein. Flue gas 118 is then again provided to the particulate collection means 54, and flue gases 120 exiting therefrom are discharged to atmosphere via stack 60.

While the location of the particulate collection means 110 was shown in FIG. 2 as being downstream of the air heater 26, this is not a requirement of the present invention and switching the locations of the air heater 26 and the particulate collection means 110 will also accomplish the desired results. Such an arrangement is schematically shown in FIG. 3, and is generally designated 200. As shown, the particulate collection device 110 receives flue gases 38 directly from the outlet of the steam generator 20, by means of flue 210. Again, particulates are removed from the flue gas stream 38 in particulate collection means 110, the collected solids being transferred via line 112 to the slaker means 68 while flue gas 212 exits therefrom and is provided to air heater 26. Cooler flue gases 214 exit from the air heater 26 via flue 42 and are again provided to the dry scrubber 44 in known fashion. Similar conveyances of flue gas 216 via flue 52 provides same to particulate collector 54 and flue 58 conveys flue gas 218 to the atmosphere again via stack 60.

Figure 4:
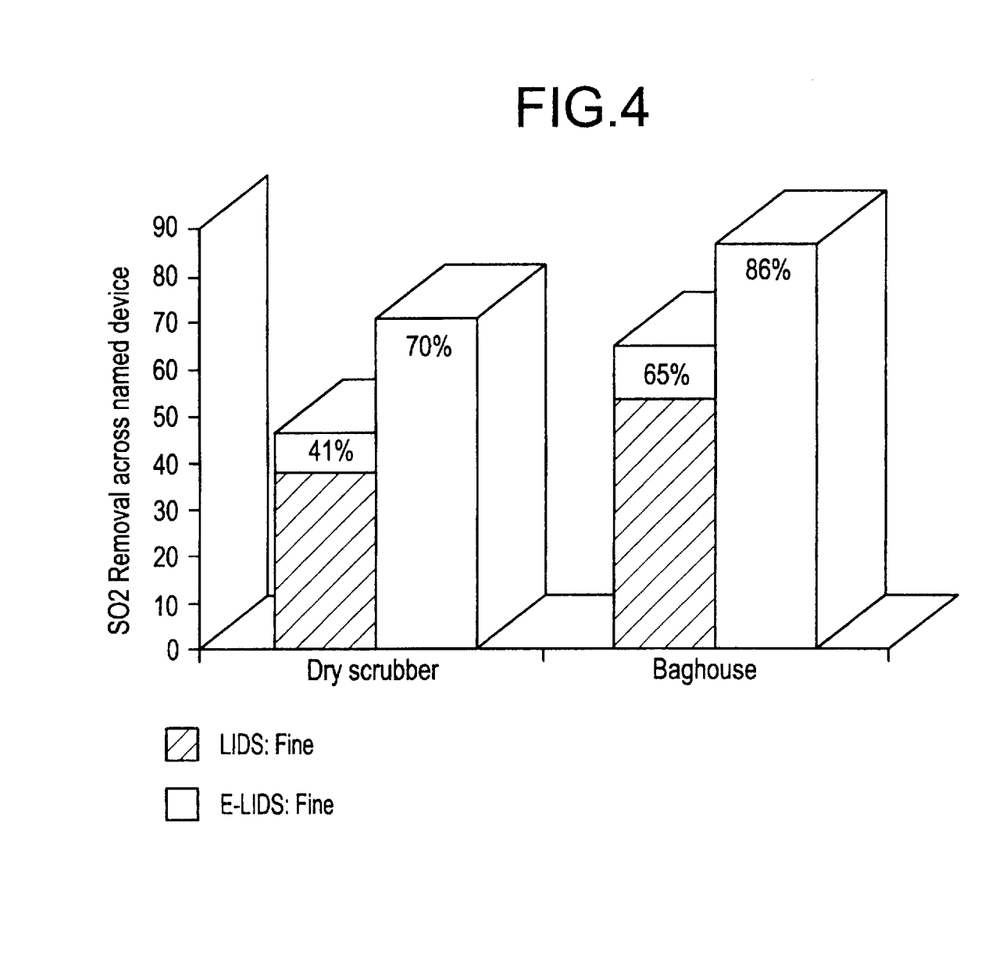
FIG. 4 is a graphical comparison of overall system $SO_2$ removal performance of LIDS™ with the enhanced limestone injection dry scrubbing (E-LIDS™) system according to the present invention.
Figure 5:
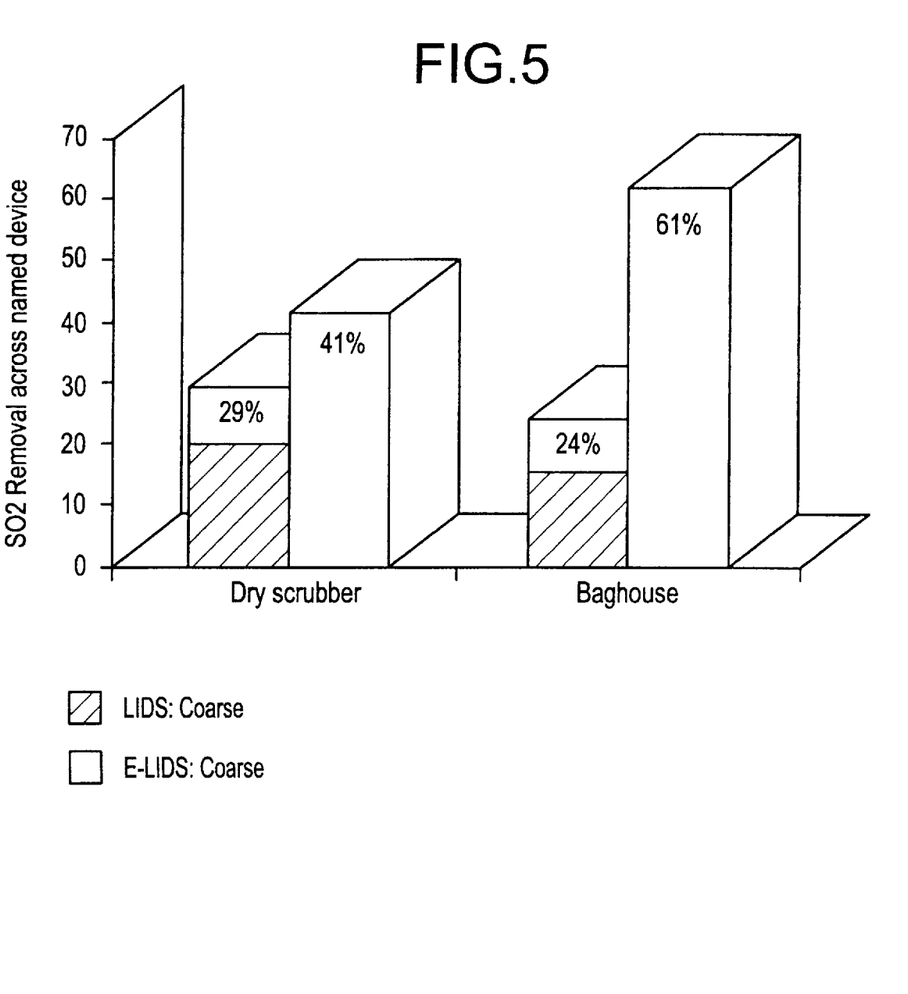
FIG. 5 is a graphical comparison of $SO_2$ removal performance across just the dry scrubber and baghouse portions of LIDS™ with the enhanced limestone injection dry scrubbing (E-LIDS™) system according to the present invention.

The ENHANCED LIDS™ system and process provides the potential for increased $SO_2$ removal efficiency (greater than 95%) and increased sorbent utilization on a wide range of coals and other fossil fuels. FIGS. 4 and 5 show the increased $SO_2$ removal across the dry scrubber 44 and final particulate collection device 54 obtained with the E-LIDS™ system and process during testing at the B&W Alliance Research Center in January, 1995. Other advantages of this approach are discussed below.

Air Toxics Removal

It is anticipated that the same conditions that result in high $SO_2$ removal efficiency for the ENHANCED LIDS™ process will also result in high removal efficiencies for at least some of the air toxics compounds (referred to as "hazardous air pollutants" in Title III of the Clean Air Amendment of 1990). The E-LIDS™ system and process results in a dry scrubber feed slurry containing a higher concentration of reactive calcium than the conventional LIDS™ process. This may result in efficient removal of acid gases other than the sulfur oxides such as hydrochloric acid (HCl) or hydrofluoric acid (HF), both of which are on the list of identified air toxics. Testing has shown that some of the compounds of mercury are also removed efficiently due to the conditions provided by the E-LIDS™ system and process. Mercury emissions are the subject of intensive research due to mercury's known build-up in the atmosphere, subsequent deposition in lakes, and potential human health impacts. Work in the area of mercury control has shown that under the proper operating conditions dry scrubbers can be extremely effective in removing mercury.

In summary, the present invention described herein provides the following advantages over the basic LIDS™ system and process:

1. Higher $SO_2$ removal.
2. Higher sorbent utilization efficiency.
3. Increased dry scrubber 44 and baghouse 54 performance.
4. More effective use of low-cost sorbent (limestone).
5. Increased dry scrubber 44 calcium stoichiometry without increasing the overall calcium stoichiometry. If a higher $SO_2$ removal is not desired, the $SO_2$ removal can be held fixed and the furnace 22 calcium stoichiometry can be decreased. Therefore, sorbent costs can be reduced.
6. For a given system $SO_2$ removal, the recycle requirement from the final particulate collector 54 can be reduced. As more of the solids for the dry scrubber feed slurry 46 comes directly from the particulate collection means 110, the amount of solids needed from the recycle stream 70 decreases.

7. Potential for enhanced air toxics removal at minimal additional cost.
8. Relatively easy to retrofit the present invention into existing steam generator 20 systems.

While specific embodiments of the invention have been shown and described in detail to illustrate the application of the principles of the invention, those skilled in the art will appreciate that changes or modifications may be made in the form of the invention covered by the following claims without departing from such principles. The present invention may be applied to new industrial or utility steam generator installations, or to the replacement, repair or modification of existing industrial or utility steam generator installations. In some embodiments of the invention, certain features of the invention may sometimes be used to advantage without a corresponding use of the other features. For example, the present invention allows for the feasibility of removing the entire solids recycle system 70 which would normally recycle particulates collected by the particulate collector 54, and those settling out from the dry scrubber 44. By using the particulate collection means 110 to capture a significant portion of the particulates from the flue gas stream exiting from the furnace 22, the present invention achieves higher and higher calcium utilization, and the particulates collected by the final particulate collector 54 contains less and less useful calcium for $SO_2$ removal; as such, the need for and the usefulness of the recycle stream 70 as a source of calcium diminishes. Alternatively, a supply stream 76 of calcium-based sorbent may be added directly into the reagent preparation (slaker) system 68 to enhance the dry scrubber feed slurry concentration for additional $SO_2$ removal if desired. This aspect may be particularly important to address certain steam generator 20 operating conditions, such as during start-up, because the limestone or calcium-based sorbent for the entire plant is provided via the furnace 22. If sufficient carry-over of the calcined limestone into the particulate collection means 110 does not occur before flue gas containing sulfur oxide species is produced, another source of sorbent must be provided to desulfurize the flue gas. Other advantages will become readily apparent upon a close inspection of the present disclosure; accordingly, all such changes, modifications and embodiments properly fall within the scope of the following claims.

We claim:

1. A method for desulfurizing and removing particulates from flue gas produced during a combustion process in a furnace of a steam generator to produce treated flue gas, comprising the steps of:

injecting limestone into an upper portion of a furnace in a temperature range of approximately 2000°–2400° F. to calcine a portion of the limestone into lime, some of the lime absorbing sulfur oxide species from a flue gas therein and producing calcium sulfate, the flue gas leaving the steam generator containing entrained particulates which are primarily fly ash calcium sulfate, and lime;

collecting particulates and thus a portion of the lime from the flue gas in first particulate collection means located downstream of the furnace and upstream of a dry scrubber means to reduce an amount of particulate entering the dry scrubber means which could otherwise be available to adsorb, absorb, or react with available water in the dry scrubber means, and maintain a higher free moisture content in particulates collected by a second particulate collection means located downstream of the dry scrubber means than would otherwise occur if the first particulate collection means was not present, to enhance removal of sulfur oxide species in the second particulate collection means;

slurrying the collected particulates and lime from the first particulate collection means with water to produce a dry scrubber feed slurry containing hydrated lime;

conveying the flue gas, from which the particulates and portion of the lime has been removed, to the dry scrubber means;

spraying the dry scrubber feed slurry into the flue gas within the dry scrubber means to further absorb sulfur oxide species from the flue gas therein by reaction with a portion of the lime and hydrated lime;

conveying the flue gas, lime and hydrated lime from the dry scrubber means to the second particulate collection means, where additional absorption of sulfur oxide species from the flue gas by reaction with the lime and hydrated lime occurs; and collecting particulates from the flue gas in the second particulate collection means to produce treated flue gas.

2. The method according to claim 1, further comprising the step of conveying the flue gas from an outlet of a convection pass of the furnace directly to air heater means located upstream of the first particulate collection means for preheating incoming combustion air provided to the furnace.

3. The method according to claim 1, further comprising the step of conveying the flue gas, from which the portion of the lime has been removed, to air heater means located downstream of the first particulate collection means for preheating incoming combustion air provided to the furnace.

4. The method according to claim 1, further comprising the step of recycling the particulates collected by the second particulate collection means back into the flue gas to further absorb sulfur oxide species from the flue gas.

5. The method according to claim 4, further comprising the step of mixing the particulates collected by the second particulate collection means with the dry scrubber feed slurry so that the particulates are sprayed into the dry scrubber means as part of the feed slurry.

6. The method according to claim 1, comprising the step of reducing an amount of particulate entering the dry scrubber means sufficient to achieve a 1.35% free moisture content in particulates collected by the second particulate collection means.

7. A method for removing pollutants from flue gas produced during a combustion process in a furnace of a steam generator to produce treated flue gas, comprising the steps of:

injecting a calcium-based sorbent into a flue gas in an upper portion of a furnace, some of the sorbent absorbing pollutants from the flue gas, the resulting flue gas containing reaction products and unused sorbent, collecting a portion of the unused sorbent as particulates from the resulting flue gas in first particulate collection means located downstream of the furnace and upstream of a dry scrubber means to reduce an amount of particulate entering the dry scrubber means which could otherwise be available to adsorb, absorb, or react with available water in the dry scrubber means, and maintain a higher free moisture content in particulates collected by a second particulate collection means located downstream of the dry scrubber means than would otherwise occur if the first particulate collection means was not present, to enhance removal of pollutants as particulates in the second particulate collection means, slurrying the collected portion of the unused sorbent from the first particulate collection means with water to produce a dry scrubber feed slurry containing hydrated lime;

conveying the flue gas, from which the particulates and portion of the unused sorbent has been removed, to the dry scrubber means;

spraying the dry scrubber feed slurry into the flue gas within the dry scrubber means to further absorb pollutants from the flue gas therein by reaction with the feed slurry and unused sorbent in the flue gas, the flue gas containing further reaction products and unused sorbent;

conveying the flue gas and any unused sorbent therein from the dry scrubber means to the second particulate collection means, where additional absorption of pollutants from the flue gas by reaction with the unused sorbent occurs; and collecting particulates from the flue gas in the second particulate collection means to produce treated flue gas.

8. The method according to claim 7, comprising the step of reducing an amount of particulate matter entering the dry scrubber means sufficient to achieve a 1.35% free moisture content in particulates collected by the second particulate collection means.

* * * * *